C. REDMOND.
SHOCK ABSORBER.
APPLICATION FILED JUNE 13, 1916.
1,250,012.
Patented Dec. 11, 1917.
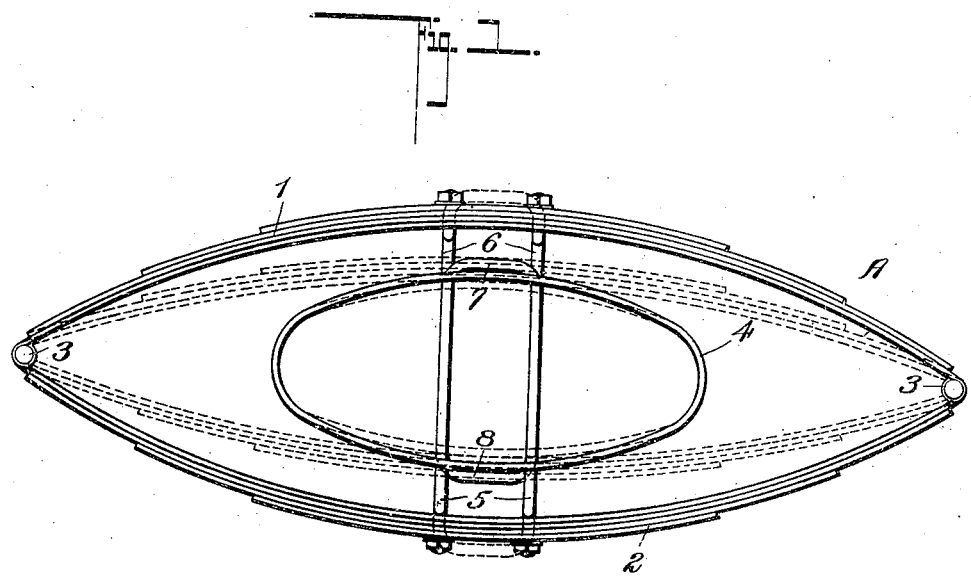
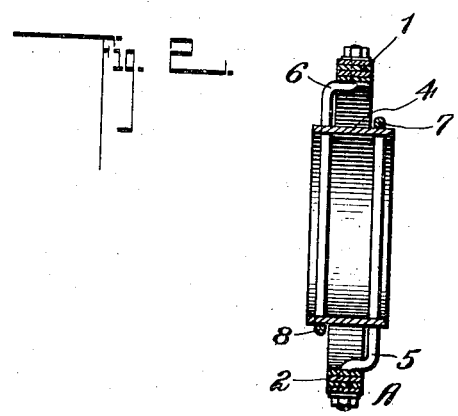
Witnesses
Philip H. Burch.
R. M. Smith.
Inventor
C. Redmond
By Victor J. Evans
Attorneys

UNITED STATES PATENT OFFICE.

CHARLES REDMOND, OF SAN ANTONIO, TEXAS, ASSIGNOR OF ONE-HALF TO A. SALISBURY, OF SAN ANTONIO, TEXAS.

SHOCK-ABSORBER.

1,250,012.

Specification of Letters Patent.

Patented Dec. 11, 1917.

Application filed June 13, 1916. Serial No. 103,512.

*To all whom it may concern:*

Be it known that I, CHARLES REDMOND, a citizen of the United States, residing at San Antonio, in the county of Bexar and State of Texas, have invented new and useful Improvements in Shock-Absorbers, of which the following is a specification.

This invention relates to shock absorbers, the object in view being to provide in connection with an ordinary body supporting spring such as is used in connection with automobiles and other vehicles, an auxiliary spring which acts in a double capacity, first to supplement the resisting action of the main spring when the vehicle body is suddenly depressed, and secondly to check or yieldingly restrain the expansive action of the main spring when the body rebounds after striking an obstruction or depression in the road surface.

A further object in view is to produce a shock absorber of the character referred to which may be applied to a vehicle body or supporting springs already in use at a minimum expense.

With the above and other objects in view, the invention consists in the novel construction, combination and arrangement of parts, as herein described, illustrated and claimed.

In the accompanying drawings:—

Figure 1 is a side elevation showing the applied relation of a shock absorbing spring of this invention to the ordinary elliptic spring as now commonly used on vehicles, said view also showing several positions of the spring by full and dotted lines.

Fig. 2 is a vertical central cross section through the same.

Referring to the drawings A generally designates one of the main body supporting springs of a vehicle such as an automobile, said spring comprising the upper spring member 1 and the lower spring member 2, said members being ordinarily connected together pivotally at their extremities at the points 3.

In carrying out the present invention I employ an elliptic spring 4 which is located between the upper and lower spring members 1 and 2 and about centrally between the extremities 3 of the main spring. Connected fixedly to the bottom spring member 2 is a U-shaped restraining member 5 having the two oppositely lying parallel portions as shown which extend through holes in the top and bottom portions of the shock absorbing spring 4. Another restraining member 6 corresponding in all respects with the restraining member 5 is fixedly connected to the upper spring member 1 and also passes through holes in the top and bottom portions of the shock absorbing spring 4. The members 5 and 6 are so connected to the bottom and top portions of the main spring A that they may freely slide in relation to each other and may also freely slide in relation to the spring 4 when the main spring A is compressed to its limit. In such event the spring 4 yieldingly resists the compression of the spring A and thereby tends to avoid breakage of the main spring. In the rebound of the vehicle body, the connecting end portions 7 and 8 of the restraining members 5 and 6 come in contact with the outer surfaces of the top and bottom portions of the spring 4 and therefore as the spring members 1 and 2 move away from each other, the top and bottom portions of the spring 4 are drawn toward each other by the action of the restraining members 5 and 6. This serves to yieldingly check said rebound of the body thereby rendering the vehicle as a whole easier running and adding materially to the comfort of the occupants of the vehicle as well as increasing the life and durability of the machine.

I claim:—

The combination with a main elliptic vehicle spring, of an auxiliary elliptic spring mounted within the main spring, a U-shaped restraining member fastened at one end to one section of the main spring and embodying parallel portions slidable through openings in the auxiliary spring, and a second U-shaped restraining member fastened to the other member of the main spring and embodying parallel portions situated transversely opposite the corresponding portions of the first named restraining member and slidable in relation to the auxiliary spring.

CHARLES REDMOND.

Copies of this patent may be obtained for five cents each, by addressing the "Commissioner of Patents, Washington, D. C."